April 17, 1962 J. KALLENBERG ETAL 3,029,645
INTEGRATING ACCELEROMETER
Filed July 21, 1959 3 Sheets-Sheet 1

INVENTORS
JOHN KALLENBERG
ROY R. SEGERDAHL
BY Borst & Borst
ATTORNEYS

April 17, 1962  J. KALLENBERG ETAL  3,029,645
INTEGRATING ACCELEROMETER

Filed July 21, 1959  3 Sheets-Sheet 2

INVENTORS
JOHN KALLENBERG
ROY R. SEGERDAHL
BY
*Borst & Borst*
ATTORNEYS

April 17, 1962 J. KALLENBERG ETAL 3,029,645
INTEGRATING ACCELEROMETER
Filed July 21, 1959 3 Sheets-Sheet 3

INVENTORS
JOHN KALLENBERG
ROY R. SEGERDAHL
BY
Boret & Boret
ATTORNEYS

United States Patent Office 3,029,645
Patented Apr. 17, 1962

3,029,645
INTEGRATING ACCELEROMETER
John Kallenberg, Stewart Manor, and Roy R. Segerdahl, Bellmore, N.Y., assignors to Sperry Rand Corporation, Ford Instrument Company Division, Wilmington, Del., a corporation of Delaware
Filed July 21, 1959, Ser. No. 829,185
11 Claims. (Cl. 73—503)

This invention relates to mechanical computers and particularly to improvements in mechanical integrators.

In the conventional mechanical integrator employing a disc, two idler balls and a roller, the various parts are assembled in an arrangement such that the axis of the roller lies in a vertical plane which includes the shaft axis of the disc and lies in a horizontal plane which is parallel to the face of the disc, the two idler balls being also disposed in the vertical plane and in contact with one another. Rotation of the disc causes the roller to rotate at a speed which is a function of the radius of the ball contact point from the center of the disc, and various sources of power can be employed to position the balls within their carriage with respect to the disc center. In the instant device the carriage for the balls serves as a mass of a spring mass system. The position of the carriage, and hence the radius of the location of the idler balls with respect to the disc center is solely a function of any acceleration which exists along the measuring axis. The spring system consists of a pair of springs, a main spring disposed along the measuring axis and a secondary spring disposed in opposition to the main spring and offset therefrom. The purpose of the secondary spring is to provide a small amount of deflection to the main spring at the zero acceleration position so that a well defined zero position can be effected and the main spring can be more easily calibrated. Calibration of the main spring enables the integrator to provide a precise relationship between acceleration and deflection of the carriage due to the force of acceleration.

One object of the invention is to provide an integrating instrument which is capable of measuring acceleration.

Figure 1:
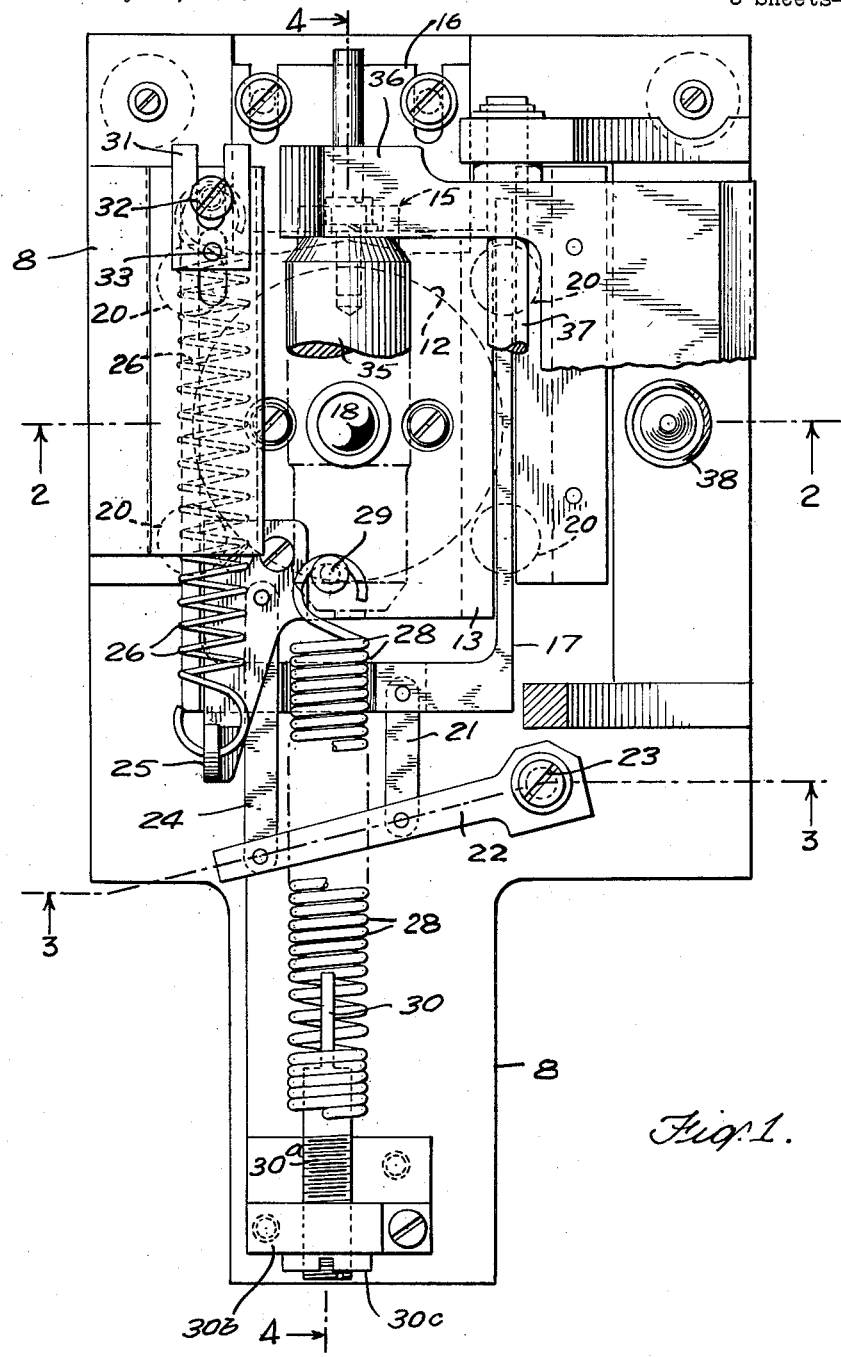
Figure 2:
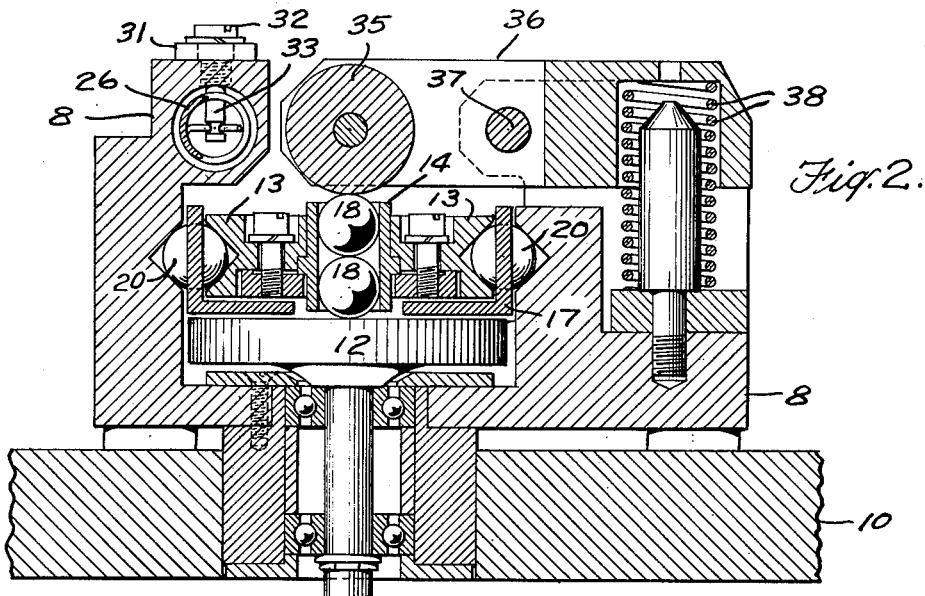
Figure 3:
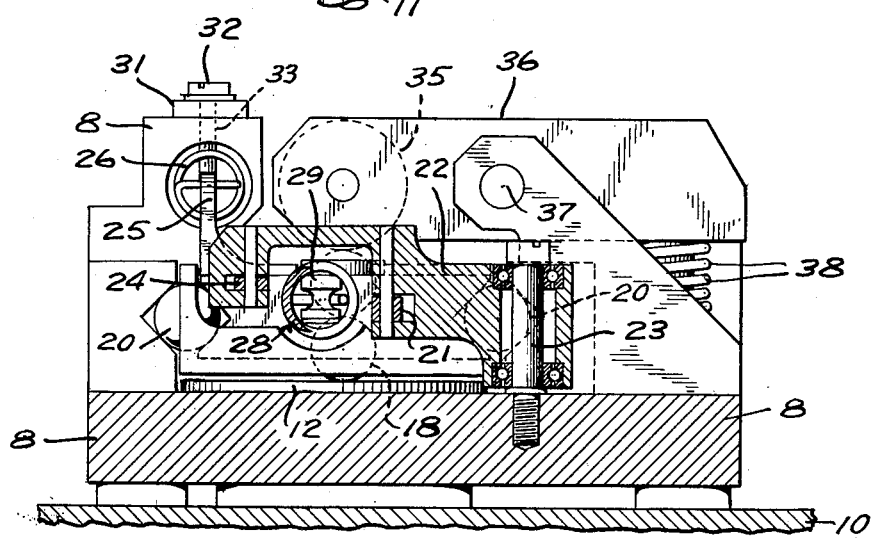
Figure 4:
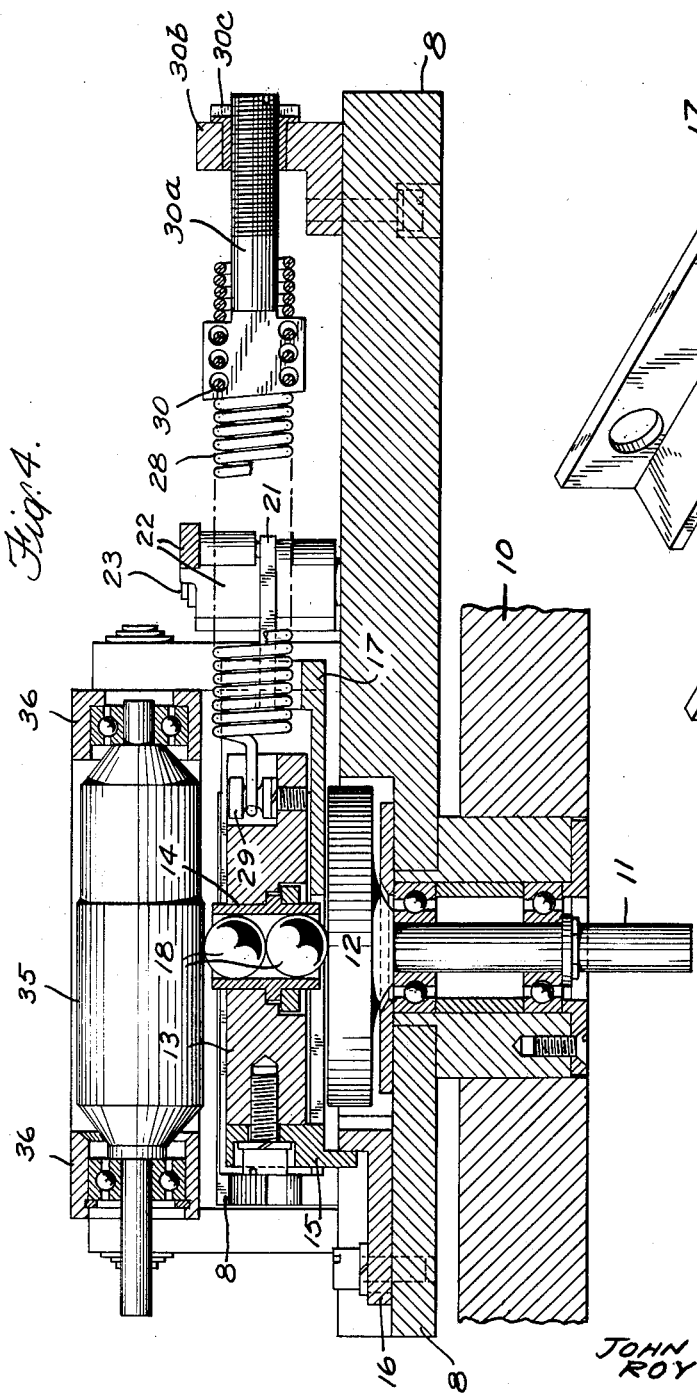
Figure 6:
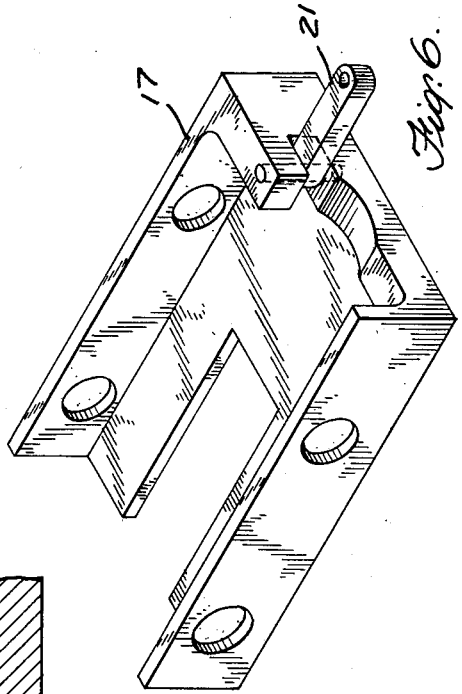
Figure 5:
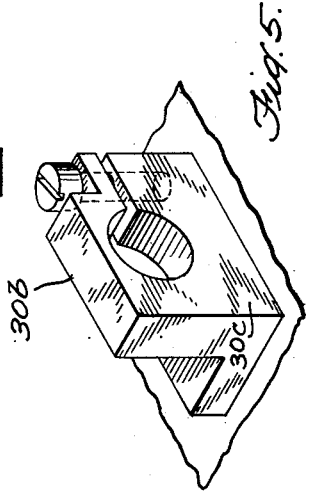

Other objects and advantages of the invention may be appreciated on reading the following detailed description which is taken in conjunction with the drawings, in which:

FIG. 1 is a plan view of the integrator with the roller and its supporting components partially shown, FIG. 2 is a transverse vertical section taken on the line 2—2 of FIG. 1, FIG. 3 is a vertical transverse section taken on the line 3—3 of FIG. 1, FIG. 4 is a longitudinal vertical section taken on line 4—4 of FIG. 1, FIG. 5 is an isometric view of the main spring clamping member, and FIG. 6 is an isometric view of the ball retainer.

Referring to the drawings, a frame 8 for the integrating instrument is mounted over a table 10 in which there is journaled a disc shaft 11 having mounted thereon a disc 12 which is disposed within the bottom of the frame 8. A carriage 13 in which there is a centrally disposed ball sleeve 14 is positioned over the integrator disc 12 and has bolted thereto at one end a stop 15 adapted to strike an abutment plate 16 adjustably attached to the bottom of the frame 8. The abutment plate 16 is positioned so that the carriage is precisely centrally located when the stop 15 and plate 16 are in contact.

The carriage 13 is slidably mounted within the frame 8. The sides of the carriage 13 and the opposing sides of the frame 8 are V-grooved to act as an inner and outer race for ball bearings 20 thereby providing a low friction mounting for carriage 13. A ball retainer 17, which is open at one end and the bottom of which is slotted at its open end to permit the desired longitudinal movement of the integrating balls 18, is provided to retain the bearings 20 in the V-grooves whenever accelerations in the measuring direction are present. The retainer 17 has two sides, each of which has a pair of ball bearing apertures which are each adapted to receive the bearings 20 therein.

The front plate of the ball retainer 17 has a pivotal link 21 which is connected to a control arm 22 at a point near its pivotal pin 23. Connected to the front end of the carriage 13 is a second pivotal link 24 which is connected to the control arm 22 near its free end. The control arm 22 and links 21 and 24 serve to maintain a precise 2:1 relative movement between the carriage and the ball bearing retainer. The displacement of the bearings 20 and retainer 17 is always exactly ½ of the displacement of the carriage 13.

The carriage 13 is also provided with a forwardly extending bracket 25 to which there is connected one end of secondary spring 26. On the rear end of the frame 8 is mounted a slide plate 31 having a slot in which there is inserted a bolt 32 which is screwed into the frame 8 and allows the slide to be adjusted in position relative to the frame. The other end of the secondary spring 26 is connected to a spring anchoring pin 33 which extends from the slide plate 31.

Main spring 28 is affixed to the anchoring pin 29 and is threaded through a spring deflection versus acceleration calibrating plate 30 mounted on the main frame of the integrator. The plate 30 is drilled for spring calibrating purposes and has attached to one of its ends a shank 30a which is threaded to engage a threaded split and castellated bushing 30c. The plate 30 is drilled in such a manner that the main spring 28 can be threaded through it, the axial spacing of the drilled holes in the calibration plate 30 being such that the deflection per coil of the stored inactive coils is greater than the expected maximum deflection per coil of the active portion. This prevents the first stored coil from ever becoming active and destroying the calibration and also the excess coil deflection provides adequate friction to preserve the adjustment.

A bracket 30b is connected to the frame 8 and has a clamping aperture, as shown in FIG. 5, in which the shank 30a is received. The position of calibration plate 30 is thereby adjustable to permit the balls 18 in the carriage 13 to be positioned directly over the disc center at zero acceleration, after the spring 30 has been calibrated.

The integrator roller 35 is mounted between the arms of a bifurcated member 36 which is pivotally mounted on shaft 37. A compression spring 38 exerted against the underside of the bifurcated member opposite the roller 35 exerts a continuous upward pressure thereon thereby maintaining the roller 35 in contact with the integrator balls 18.

Various modifications may be effected in the construction of the integrator as above described without departing from the principle and scope of the invention as defined in the appended claims.

What is claimed is:

1. An integrating accelerometer of the character described comprising a frame, a disc rotatably mounted in said frame for rotation about a vertical axis, a roller carried by said frame in vertically spaced relation to said disk for rotation about a horizontal axis, an acceleration responsive carriage, mounting means by which said carriage is slidably mounted in said frame between said disc and said roller, a ball cage mounted in said carriage, a pair of vertically aligned contacting integrating balls mounted in said cage with the lowermost ball in contact with said disc and the uppermost ball in contact with said roller, means yieldingly biasing said roller into engagement with said uppermost ball, a coiled tension main spring having one end thereof secured to said carriage and the other end thereof secured to tension adjusting calibrating means carried by said frame, said main spring being operative to control the movement and position of said carriage with respect to said disc in accordance with varying rates of acceleration imparted to said accelerometer and to maintain said carriage in normal initial position with the centers of said balls integrating disposed in the axis of rotation of said disc during zero acceleration.

2. An integrating accelerometer as defined by claim 1 in which said mounting means comprises a first pair of spaced parallel longitudinally extending opposing V-shaped grooves one of which is disposed in one side of said carriage and the other of which is disposed in said frame, a second pair of similar longitudinally extending opposing V-shaped grooves one of which is disposed in the opposite side of said carriage and the other of which is disposed in said frame, a plurality of bearing balls disposed in each pair of opposing V-shaped grooves, and a longitudinally movable ball retainer by which said balls are maintained in said pairs of opposing grooves in spaced relation to each other.

3. An integrating accelerometer as defined by claim 2 in which said ball retainer comprises a pair of spaced parallel longitudinally extending vertically disposed side plates connected together at one end thereof, one of said side plates being disposed between the grooves of said first pair of opposing groove and the other of said side plates being disposed between the grooves of said second pair of opposing grooves, and apertures in said side plates through which said balls extend.

4. An integrating accelerometer as defined by claim 3 in which interconnecting means between said carriage and said ball retainer are provided by which the relative movement of said carriage with respect to said ball retainer is maintained at a ratio of two to one.

5. An integrating accelerometer as defined by claim 4 in which said interconnecting means comprises a control arm having one end thereof pivotally connected to said frame, a first link having one end thereof pivotally connected to the free end of said control arm and the other end thereof pivotally connected to said carriage, and a second link having one end thereof pivotally connected to said ball retainer and the other end thereof pivotally connected to said control arm intermediate the pivot axis thereof and the pivotal connection between said first link and said control arm.

6. An integrating accelerometer as defined in claim 5 in which said tension adjusting means comprises a plate having a plurality of apertures through which the said other end of said spring is threaded and a threaded shank by which said plate is secured to said frame for longitudinal adjustment.

7. An integrating accelerometer as defined by claim 6 in which a secondary coiled tension spring having one end thereof secured to said carriage and the other thereof adjustably secured to said frame, said secondary spring being of lesser strength than said main spring and acting in opposition to said main spring.

8. An integrating accelerometer as defined by claim 5 in which a secondary coiled tension spring having one end thereof secured to said carriage and the other thereof adjustably secured to said frame, said secondary spring being of lesser strength than said main spring and acting in opposition to said main spring.

9. An integrating accelerometer as defined by claim 1 in which said tension adjusting means comprises a plate having a plurality of apertures through which the said other end of said spring is threaded and a threaded shank by which said plate is secured to said frame for longitudinal adjustment.

10. An integrating accelerometer as defined by claim 9 in which a secondary coiled tension spring having one end thereof secured to said carriage and the other thereof adjustably secured to said frame, said secondary spring being of lesser strength than said main spring and acting in opposition to said main spring.

11. An integrating accelerometer as defined by claim 1 in which a secondary coiled tension spring having one end thereof secured to said carriage and the other thereof adjustably secured to said frame, said secondary spring being of lesser strength than said main spring and acting in opposition to said main spring.

References Cited in the file of this patent

UNITED STATES PATENTS

| | | |
|---|---|---|
| 2,346,798 | Summers | Apr. 18, 1944 |
| 2,481,039 | Ross | Sept. 6, 1949 |
| 2,622,865 | Sundt | Dec. 23, 1952 |